US011863644B2

(12) United States Patent
Onnen et al.

(10) Patent No.: US 11,863,644 B2
(45) Date of Patent: *Jan. 2, 2024

(54) PUSH NOTIFICATION DELIVERY SYSTEM WITH FEEDBACK ANALYSIS

(71) Applicant: Airship Group, Inc., Portland, OR (US)

(72) Inventors: Erik A. Onnen, Portland, OR (US); Steven L. Osborn, II, Hillsboro, OR (US)

(73) Assignee: Airship Group, Inc., Portland, OR (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/989,697

(22) Filed: Nov. 18, 2022

(65) Prior Publication Data

US 2023/0104506 A1    Apr. 6, 2023

Related U.S. Application Data

(63) Continuation of application No. 17/193,814, filed on Mar. 5, 2021, now Pat. No. 11,539,809, which is a
(Continued)

(51) Int. Cl.
*H04L 67/55* (2022.01)
*H04L 67/52* (2022.01)
*H04W 68/00* (2009.01)

(52) U.S. Cl.
CPC .............. *H04L 67/55* (2022.05); *H04L 67/52* (2022.05); *H04W 68/00* (2013.01)

(58) Field of Classification Search
CPC ......... H04L 67/55; H04L 67/52; H04W 68/00
See application file for complete search history.

(56) References Cited

U.S. PATENT DOCUMENTS 6,421,781 B1    7/2002 Fox et al.
6,763,384 B1    7/2004 Gupta et al.
(Continued)

OTHER PUBLICATIONS

U.S. Office Action, U.S. Appl. No. 13/160,226, filed Mar. 18, 2013, 15 pages.
(Continued)

*Primary Examiner* — Benjamin M Thieu
(74) *Attorney, Agent, or Firm* — Fenwick & West LLP

(57) ABSTRACT

A push notification delivery system includes a server system including a processor, a network interface, and memory storing program instructions having code segments for receiving a received push notification, code segments for determining at least one of a favorable push time and a favorable message format based upon a database of received push information developed from a plurality of prior sent push notifications, and code segments for pushing the message to the destination in accordance with the at least one of a favorable push time and a favorable message format. A method for delivering push notifications includes receiving a received push notification including a message and a destination, sending a sent push notification derived from the received push notification to the destination in accordance with at least one favorable condition, receiving received push information related to the sent push notification, and storing the received push information in a database.

20 Claims, 9 Drawing Sheets

Related U.S. Application Data continuation of application No. 16/741,653, filed on Jan. 13, 2020, now Pat. No. 10,972,565, which is a continuation of application No. 16/183,265, filed on Nov. 7, 2018, now Pat. No. 10,601,940, which is a continuation of application No. 15/017,464, filed on Feb. 5, 2016, now Pat. No. 10,142,430, which is a continuation of application No. 14/244,585, filed on Apr. 3, 2014, now Pat. No. 9,277,023, which is a continuation of application No. 13/160,226, filed on Jun. 14, 2011, now Pat. No. 8,731,523.

(56) References Cited

U.S. PATENT DOCUMENTS

| | | | |
|---|---|---|---|
| 7,587,609 | B2 | 9/2009 | Arnone et al. |
| 7,769,868 | B2 | 8/2010 | Mishra et al. |
| 7,849,505 | B2 | 12/2010 | Satterlee et al. |
| 7,860,975 | B2 | 12/2010 | Elving et al. |
| 8,064,896 | B2 | 11/2011 | Bell et al. |
| 8,099,764 | B2 | 1/2012 | Herzog et al. |
| 8,249,957 | B2 | 8/2012 | Mullen et al. |
| 8,260,864 | B2 | 9/2012 | Sana et al. |
| 8,676,682 | B2 | 3/2014 | Kalliola |
| 8,731,523 | B1 | 5/2014 | Onnen et al. |
| 9,088,624 | B2 | 7/2015 | Grigoriev |
| 10,244,066 | B2 | 3/2019 | Lowry et al. |
| 10,862,989 | B2 | 12/2020 | Lowry et al. |
| 2004/0019651 | A1 | 1/2004 | Andaker |
| 2004/0024880 | A1 | 2/2004 | Elving et al. |
| 2004/0068665 | A1 | 4/2004 | Fox et al. |
| 2005/0135306 | A1 | 6/2005 | McAllen et al. |
| 2006/0173959 | A1 | 8/2006 | McKelvie et al. |
| 2006/0217126 | A1* | 9/2006 | Sohm ................ H04W 4/18 455/454 |
| 2007/0133520 | A1 | 6/2007 | Kakivaya et al. |
| 2007/0156869 | A1 | 7/2007 | Galchev et al. |
| 2007/0160070 | A1 | 7/2007 | Buchhop et al. |
| 2007/0255957 | A1 | 11/2007 | Arnone et al. |
| 2007/0264948 | A1 | 11/2007 | Jansson et al. |
| 2008/0003996 | A1 | 1/2008 | Strandell et al. |
| 2008/0046995 | A1 | 2/2008 | Satterlee et al. |
| 2008/0080530 | A1 | 4/2008 | Kaler |
| 2008/0186929 | A1 | 8/2008 | Rice et al. |
| 2009/0106377 | A1 | 4/2009 | McQuillen et al. |
| 2009/0158397 | A1 | 6/2009 | Herzog et al. |
| 2009/0181705 | A1* | 7/2009 | Yin .................. H04L 51/066 709/206 |
| 2009/0204666 | A1 | 8/2009 | Sana et al. |
| 2009/0265471 | A1 | 10/2009 | Li et al. |
| 2010/0094985 | A1 | 4/2010 | Abu-Samaha et al. |
| 2010/0100600 | A1 | 4/2010 | Thompson et al. |
| 2010/0138501 | A1 | 6/2010 | Clinton et al. |
| 2010/0173658 | A1* | 7/2010 | Fan ................ H04W 72/51 455/466 |
| 2011/0029598 | A1 | 2/2011 | Arnold et al. |
| 2011/0173681 | A1 | 7/2011 | Qureshi et al. |
| 2011/0208869 | A1 | 8/2011 | Abu-Samaha et al. |
| 2011/0217953 | A1 | 9/2011 | O'Reilly |
| 2011/0225298 | A1 | 9/2011 | Brown et al. |
| 2011/0249079 | A1 | 10/2011 | Santamaria et al. |
| 2011/0252240 | A1 | 10/2011 | Freedman et al. |
| 2012/0023226 | A1 | 1/2012 | Petersen et al. |
| 2012/0050455 | A1 | 3/2012 | Santamaria et al. |
| 2012/0084153 | A1 | 4/2012 | Moreau et al. |
| 2012/0143806 | A1 | 6/2012 | Sundelin et al. |
| 2012/0173610 | A1 | 7/2012 | Bleau et al. |
| 2012/0210415 | A1 | 8/2012 | Somani et al. |
| 2012/0231770 | A1 | 9/2012 | Clarke et al. |
| 2012/0303774 | A1* | 11/2012 | Wilson ............... H04L 51/214 709/223 |
| 2012/0311046 | A1* | 12/2012 | Grigoriev ........... H04L 67/303 709/206 |

OTHER PUBLICATIONS

U.S. Advisory Action, U.S. Appl. No. 13/683,318, filed Feb. 5, 2014, 3 pages.

U.S. Office Action, U.S. Appl. No. 13/326,269, filed Jan. 13, 2012, 15.

U.S. Office Action, U.S. Appl. No. 13/683,318, filed Apr. 29, 2015, 11 pages.

U.S. Office Action, U.S. Appl. No. 13/683,318, filed Apr. 4, 2013, 10 pages.

U.S. Office Action, U.S. Appl. No. 13/683,318, filed Nov. 27, 2013, 10 pages.

U.S. Office Action, U.S. Appl. No. 13/683,318, filed Nov. 5, 2014, 11 pages.

U.S. Office Action, U.S. Appl. No. 14/244,585, filed Apr. 23, 2015, 14 pages.

U.S. Office Action, U.S. Appl. No. 17/098,863, filed Jul. 29, 2021, 20 pages.

U.S. Office Action, U.S. Appl. No. 17/193,814, filed Jun. 15, 2022, 7 pages.

* cited by examiner

PUSH NOTIFICATION DELIVERY SYSTEM WITH FEEDBACK ANALYSIS

CROSS REFERENCE TO RELATED APPLICATIONS

This application is a continuation of U.S. patent application Ser. No. 17/193,814, filed Mar. 5, 2021, which is a continuation of U.S. patent application Ser. No. 16/741,653, filed Jan. 13, 2020 (now U.S. Pat. No. 10,972,565), which is a continuation of U.S. patent application Ser. No. 16/183,265, filed on Nov. 7, 2018, (now U.S. Pat. No. 10,601,940), which is a continuation of U.S. patent application Ser. No. 15/017,464, filed on Feb. 5, 2016, (now U.S. Pat. No. 10,142,430), which is a continuation of U.S. patent application Ser. No. 14/244,585, filed on Apr. 3, 2014, (now U.S. Pat. No. 9,277,023), which is a continuation of U.S. patent application Ser. No. 13/160,226, filed on Jun. 14, 2011, (now U.S. Pat. No. 8,731,523), all of which are incorporated herein by reference in their entirety for all purposes.

BACKGROUND OF THE INVENTION

Push technology (aka "server push") is a type of internet-based communication where the request for a given transaction is initiated by a "publisher" or server. It is contrasted with pull technology where the request for transmission of information is initiated by a receiving device or "client."

Push services are sometimes based upon information preferences expressed in advance. This is referred to as a "publish/subscribe" model. For example, a client might subscribe to one or more information "channels." The server associated with the channels can then push information to the client when new content becomes available.

There are many types of push services. For example, synchronous conferencing and instant messaging are forms of push services. Increasingly popular are push-enabled web applications including market data distribution (e.g. stock tickers), online chat/messaging systems (e.g. "webchat"), auctions, online betting and gambling, sports results, monitoring consoles and sensor network monitor.

There are also hybrid push/pull systems. For example, email begins as a push system in that the SMTP protocol upon which it is based is a push protocol. However, the last step in the delivery of an email, e.g. from a mail server to a desktop computer, typically uses a pull protocol such as POP3 or IMAP.

As will be appreciated, there are many and widespread uses for push technology. However, one drawback of such technology is that it is, essentially, a unidirectional technology where pushes are sent to devices and then forgotten. This limits the opportunity to improve the effectiveness of future pushes by deriving feedback as to the effectiveness of prior pushes.

SUMMARY

A method for delivering push notifications, set forth by way of example and not limitation, includes receiving a received push notification including a message and a destination, determining for the received push notification at least one of a favorable push time and a favorable message format based upon a database of received push information developed from a plurality of prior sent push notifications, and sending a sent push notification derived from the received push notification to the destination in accordance with the at least one of a favorable push time and a favorable message format. Sending push notifications at a favorable push time and/or in a favorable message format can improved the effectiveness of the push notification.

A push notification delivery system, set forth by way of example and not limitation, includes a server system including a processor, memory, and a network interface. By way of non-limiting example, the memory stores program instructions having code segments for receiving a received push notification including a message and a destination, code segments for determining for the received push notification at least one of a favorable push time and a favorable message format based upon a database of received push information developed from a plurality of prior sent push notifications, and code segments for pushing the message to the destination in accordance with the at least one of a favorable push time and a favorable message format.

A non-transient computer readable medium including program instructions includes, by way of example and not limitation, code segments for receiving a received push notification including a message and a destination, code segments for determining for the received push notification at least one of a push time and a message format based upon a database of received push information developed from a plurality of prior sent push notifications, and code segments for pushing the message to the destination in accordance with the at least one of a push time and a message format.

A method for delivering push notifications, set forth by way of example and not limitation, includes receiving a received push notification including a message and a destination. sending a sent push notification derived from the received push notification to the destination in accordance with at least one favorable condition, receiving received push information related to the sent push notification, and storing the received push information in a database. Storing the received push information in a database permits, by way of non-limiting example, the use of a number of data mining techniques to determine factors which can improve the push notification delivery process.

These and other embodiments and advantages and other features disclosed herein will become apparent to those of skill in the art upon a reading of the following descriptions and a study of the several figures of the drawing.

BRIEF DESCRIPTION OF THE DRAWINGS

Several examples will now be described with reference to the drawings, wherein like components are provided with like reference numerals. The examples are intended to illustrate, but not to limit, various aspects of inventions disclosed herein. In the drawings.

DETAILED DESCRIPTIONS

Figure 1:
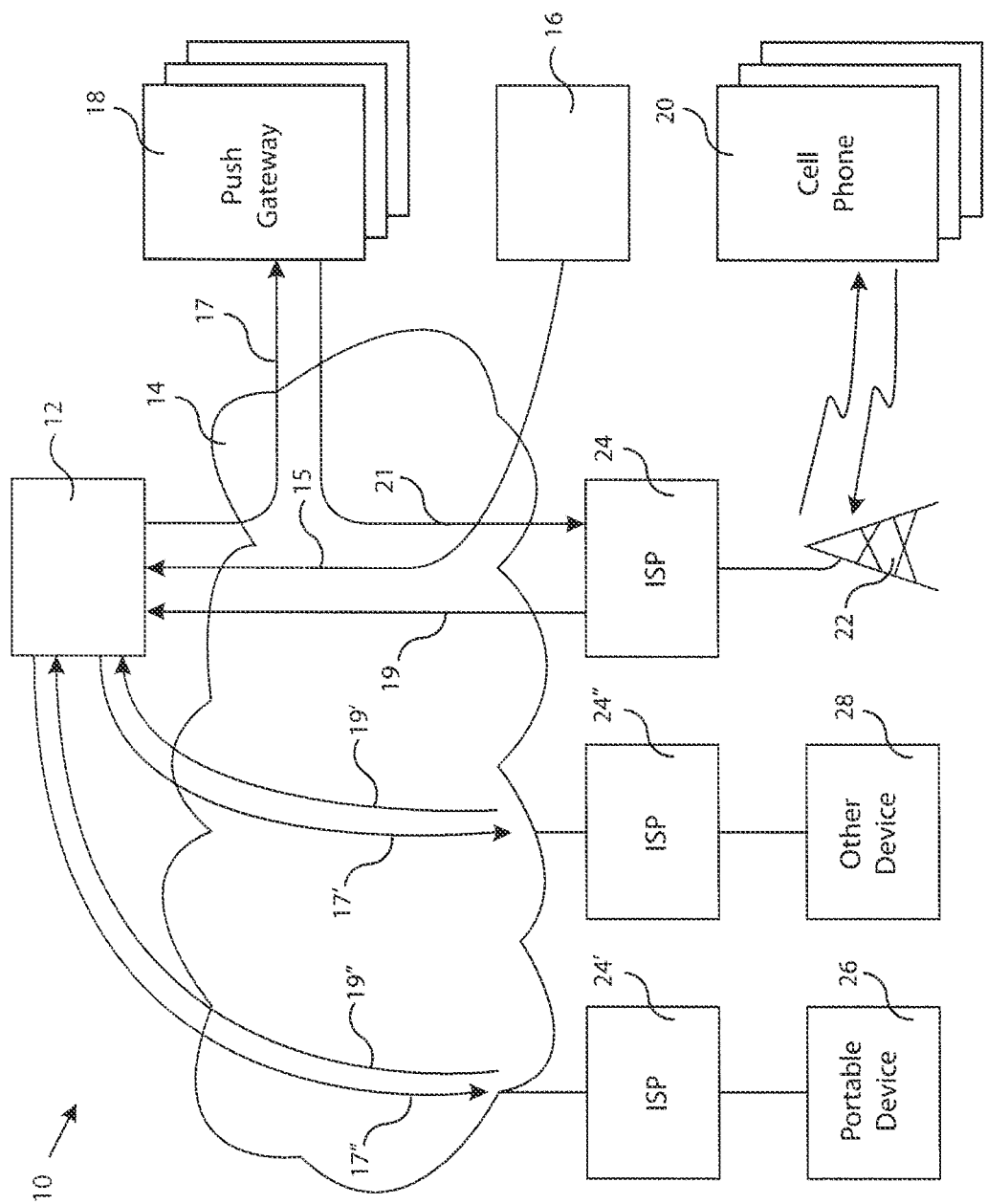
FIG. 1 is a diagram depicting an example system for delivering push notifications.

FIG. 1 is a diagram depicting, by way of non-limiting example, a system 10 for delivering push notifications. In this example, a notification server system 12 is coupled to the Internet 14 for TCP/IP communication. As will be appreciated by those of skill in the art, the server system 12 may include one or more servers.

Stored in memory of notification server system 12 are program instructions including a number of code segments for implementing various processes of the server system 12. For example, the notification server system 12 includes code segments for receiving a received push notification 15 from a push originator server system 16 (such as a customer website) via Internet 14. The received push notification can include a message and a destination, for example.

Example notification server system 12 can also include code segments for creating a send token and a sent push notification, e.g. a sent push notification 17, derived from the received push notification 15. The send token can be used to distinguish the sent push notification from other push notifications. For example, the sent push notification 17 with send token can be sent over the Internet to a push gateway server system 18. The push gateway server system 18 can then send, for example, a push notification to a mobile device 20. A mobile device 20 can be, by way of non-limiting examples, a cell phone, a smart phone, a mobile texting device, a tablet computer, etc. In other embodiments, a sent push notification 17'I17" with send token can be sent to other destinations such as a client computer, proxy server, device, etc.

In this example, gateway server system 18 is typically provided by a provider implementing push notification protocols which are particular to, for example, a certain type of mobile device 20. For example, iPhone® and Android® mobile devices (e.g. smart phones, tablet computers, etc.) have dedicated push gateways maintained by Apple, Inc. and Google, Inc., respectively. It should be noted that the push gateway server system 18 may be part of notification server system 12 or may be separate, as shown in FIG. 1.

In the example of FIG. 1, code segments are also included in notification server system 12 for receiving received push information 19 concerning a processing of the sent push notification. These code segments can, for example, identify the sent push notification from the received push information 19 by the send token. For example, received push information can be developed by a mobile device 20 which is coupled to, by way of non-limiting example, a cellular network 22 and from there to the Internet 14, such as by an Internet Service Provider (ISP) 24. TCP/IP protocol communications can thus occur between mobile device 20 and notification server system 12 including the received push information 19.

It will be appreciated that mobile device 20 is just one example of a device or "client" that is receptive to push notifications. For example, a portable device 26 can communicate through Internet 14 via an ISP 24' using a WiFi or cable connection. Other devices 28, such personal computers, tablets, etc. can also communicate with the Internet 14 via an ISP 24". Alternatively, devices receptive to push notifications may be coupled directly to Internet 14. In any event, the devices, however they may be coupled to the Internet, are capable of communicating with notification server system 12 to provide, for example, received push information 19.

Thus, despite the different ways in which they are coupled to Internet 14, portable device 26, other device 28 and still other devices, systems and apparatus not shown can participate in the receiving of push notifications and the providing of information concerning a processing of a push notification in much the same way described previously with respect to the example of mobile device 20. By way of further non-limiting examples, portable device 26, other device 28 and still other devices, systems and apparatus may receive sent push notifications 17 without the intermediary of a push gateway server system 18.

According to certain example embodiments, notification server system 12 receives a push notification including a message and a destination from push originator server system 16. Upon receiving the push notification, notification server system 12 can create. for example, a push token. As used herein, a "push token" is an identifier used to represent the received push notification and is suitable to be used as a key in performing lookups to retrieve information pertaining to the received push notification identified by the push token. The push token may be derived in some way from the received push notification and/or metadata related thereto (e.g. a hash) or may be otherwise generated or assigned (e.g. it may be randomly assigned).

In this example, an operation is performed by which the recipients of the push message are identified. Further, push messages are generated which are addressed to the one or more recipients of the push notification and which preferably include another identifier referred to as a "send token." As used herein, a "send token" is an identifier used to represent a sent push notification and is suitable to be used as a key in performing lookups to retrieve information pertaining to the sent push notification identified by the send token. The send token may be linked to the sent push notification or may be unrelated to the sent push notification.

The send token, in this example, is therefore used to represent the sent push notification. The send token may also be associated with the push token on a one-to-one or many-to-one basis. That is, a single push token may be associated with a single send token or with multiple send tokens. In such an arrangement, it is possible to retrieve information about the receive push notification associated with the push token using the send token as a key, and also possible to, given a push token, retrieve information about the sent push messages associated with one or more associated send tokens. It is therefore apparent that a one-to-many mapping may exist between the push token and the send tokens and that this mapping can be used to obtain related information given a push token or a send token.

By way of non-limiting example, a sent push notification 17, 17' or 17" derived from a received push notification 15 and a send token is sent over the Internet 14 to a designated destination. For example, push gateway server system 18 is configured to forward the sent push notification 17 to its destination, e.g. mobile device 20 or other mobile device, by non-limiting examples. Notification server system 12 is disposed to receive push information 19, 19' or 19"concerning a processing of the sent push notification as identified by the related send token.

The send token can be, for example, stored in a memory of notification server system 12 to identify the sent push notification. Also, the received push information can be stored, for example, in a memory of notification server system 12. The received push notification and/or the sent push notification can also be stored in a memory of notification server system 12, for example.

By way of further example, a push token can be created after receiving the received push notification and can be subsequently stored in a memory of notification server system 12. The sent push notification can be sent to one or more destinations. In this example, a number of send tokens are created corresponding to the number of destinations. It will therefore be apparent that there can be a one-to-one or many-to-one mapping between the send token(s) and the push token.

By way of non-limiting example, program instructions stored in a memory of notification server system 12 can include code segments for receiving a received push notification including a message and a destination, code segments creating a send token, code segments sending a sent push notification derived from the received push notification and the send token, and code segments receiving received push information which is identified by the send token concerning a processing of the sent push notification. In this example, the program instructions can further include code segments for creating a push token after receiving the received push notification. By still further example, the program instructions can include code segments for storing in a persistent database of notification server system 12 at least one of a received push notification, a sent push notification, a send token and a push token.

By way of example and not limitation, a device or "client," such as a mobile device 20, portable device 26 or other device 28, may include program instructions stored in a memory which include code segments for receiving a push notification with send token, code segments for processing the push notification and code segments for sending push information which is identified by the send token concerning the processing of the push notification. Such push information can be sent to, for example, notification server system 12 to provide feedback from the device as to the processing of the push notification.

By way of non-limiting example, code segments for processing the push notification can be associated with an application program running on the client. For example, code segments for processing the push notification can include a library of code segments which can be utilized by the application program. Further, the push information, in this example, includes information concerning the use of the push notification by the application program. The push information may be augmented by other information, such as life cycle event information pertaining to the device or an application program of the device. Such life cycle information may be sent separately or may in some cases accompany the push information.

Figure 2:
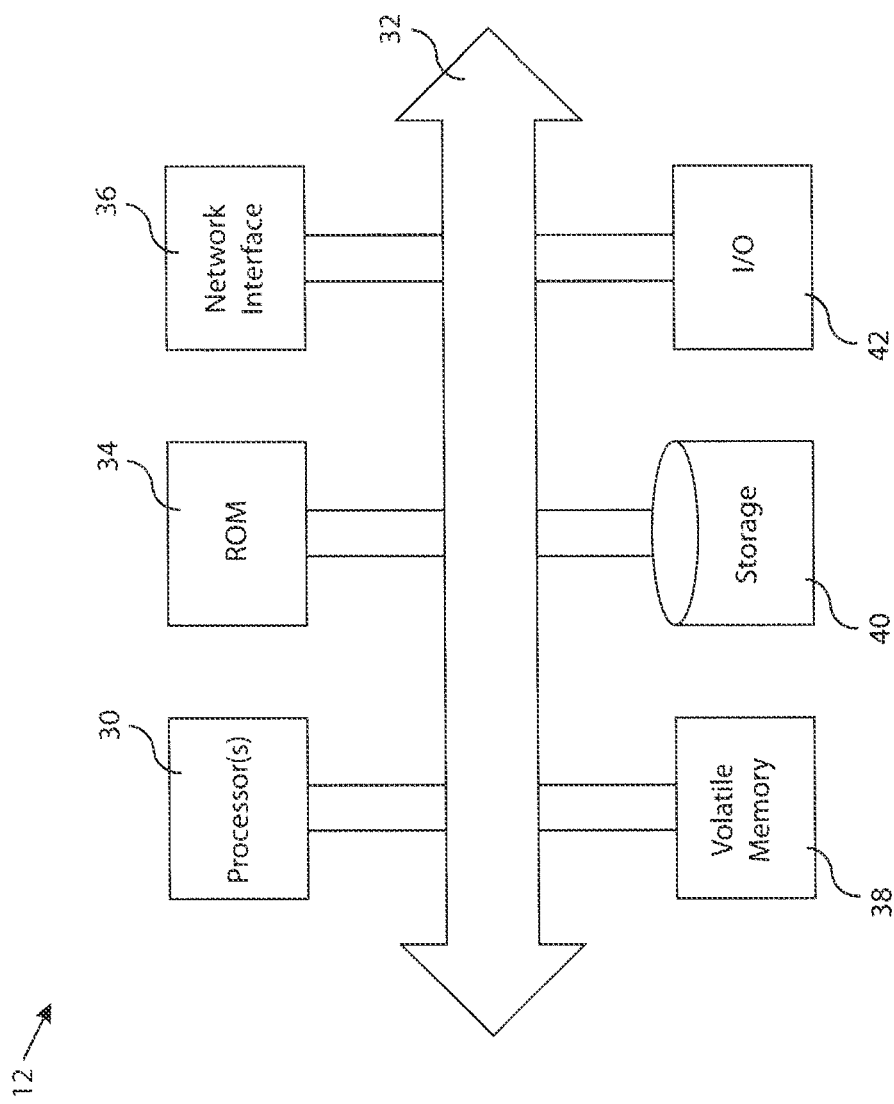
FIG. 2 is a block diagram of an example notification server system 12 of FIG. 1.

FIG. 2 is a block diagram depicting certain example embodiments of, for example, a notification server system 12 of FIG. 1 which comprises at least one processor 30, which may be a multi-core processor and may include a cache memory, coupled to a bus 32. Also coupled to bus 32 is a ROM 34 which typically contains program instructions comprising a BIOS of notification server system 12. A network interface 36 is coupled between bus 32 and a network (e.g. the Internet). Volatile memory 38 is coupled to bus 32 to act as a fast random access memory (RAM) of processor 30. In addition to processor 30, other devices coupled to bus 32 may access volatile memory 38 using, for example, DMA transfers. As used herein, "volatile memory" will refer to memory that loses data when its power source is removed.

Non-volatile memory 40 is, by way of non-limiting example, coupled to bus 32 and can serve as storage for the various program instructions and data for notification server system 12. As used herein, "non-volatile memory" shall refer to a non-volatile computer readable medium such as a hard disk drive, optical drive, flash memory or other computer readable memory which does not lose data when power is removed. In certain examples some or all of the non-volatile memory remote or network attached storage.

Both volatile memory and non-volatile memory are examples of non- transitory computer readable media. As used herein, "non-transitory computer readable media" refers to a physical memory and excludes propagating electromagnetic waves and/or other forms of non-statutory subject matter in accordance with current USPTO protocols.

According to certain example embodiments, non-volatile memory 40 will store program instructions comprising an operating system for notification server system 12. The operating system may be UNIX, Linux, Windows, or another operating system, as will be appreciated by those of skill in the art. Further, a portion of the storage capacity of non-volatile memory 40 may be used to store one or more databases and associated code segments. Of course, operating system code segments, databases and associated code segments, etc. may also be stored in volatile memory for as long as it is provided with power.

I/O subsystem 42 is coupled to bus 32 and handles the various input and output operations of notification server system 12, which may include, by way of example and not limitation, output to a display, input from a keyboard, input from a pointing device, etc. Such devices may be coupled part-time to I/O subsystem 42. Such devices may also be coupled via the network interface and a network which may be Internet 14 or another LAN or WAN. This allows for remote control and monitoring of notification server system 12.

It should be noted that the notification server system 12 of FIG. 1 may comprise multiple servers, load balancers, etc. Therefore, as used herein, a "notification server system" comprises one or more servers configured to implement the processes described herein. The notification server system 12 depicted in FIG. 2 is but one example hardware configuration for a notification server system.

Figure 3:
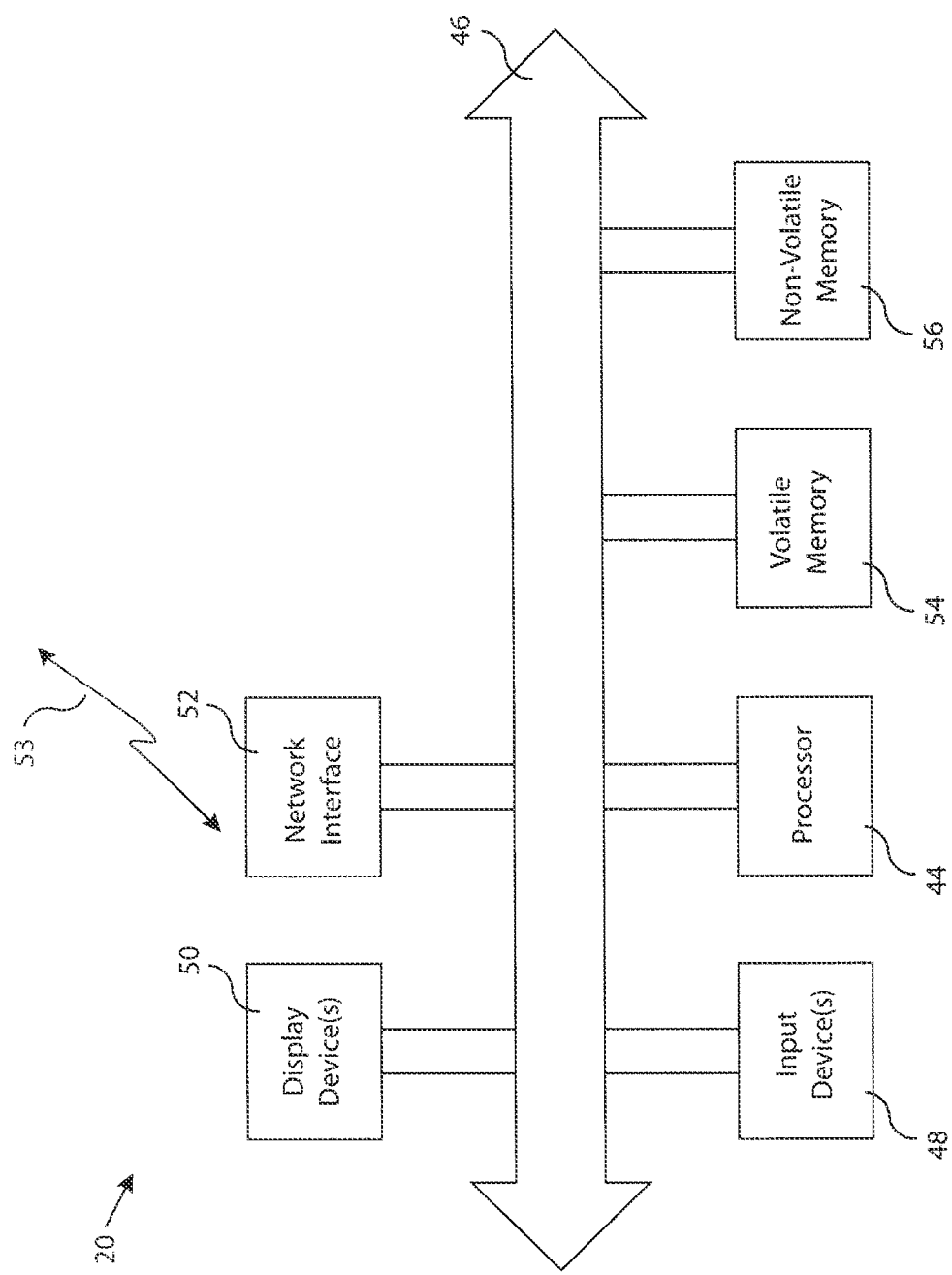
FIG. 3 is a block diagram of an example device 20 of FIG. 1.

FIG. 3 is a block diagram depicting certain example embodiments of a device such as mobile device 20 of FIG. 1. In this example, mobile device 20 includes a processor 44, which may be a multi-core processor and may include a cache memory, which is coupled to bus 46. Also coupled to bus 46, in this example, is input device subsystem 48 which comprises various input devices, which may include, by way of example and not limitation, a pointing device, such as a touch screen, a keyboard input device, which may be physical or software generated (virtual), a microphone for audio input, a camera for the input of still images or video, and various other sensors. Input device subsystem 48 of mobile device 20 may have more or fewer devices depending on design choice, cost, etc.

A display subsystem 50 of mobile device 20 is coupled to bus 46 and may include, by way of example and not limitation, a flat panel display such as an LCD display, electronic paper display, etc., an adapter to drive other attachable displays, etc. Also, display subsystem 50 of mobile device 20 may include an electro-acoustic transducer (aka "speaker" or "earphone") for audio output.

In this example, a network interface 52, coupled to bus 46, provides access to a cellular network 22. This is typically accomplished with a bidirectional RF digital communication link 53. A memory 54 serves, in this example, as a random access (RAM) memory of processor 44.

In addition to processor 44, other devices coupled to bus 46 may access memory 54 (which may be volatile memory) using, for example, DMA transfers. A non-volatile memory 56 (e.g. "flash" memory) is coupled to bus 46 in certain examples, which can provide storage for program instructions for an operating system of mobile device 20, as well as program instructions for the various applications of mobile device 20.

Figure 4:
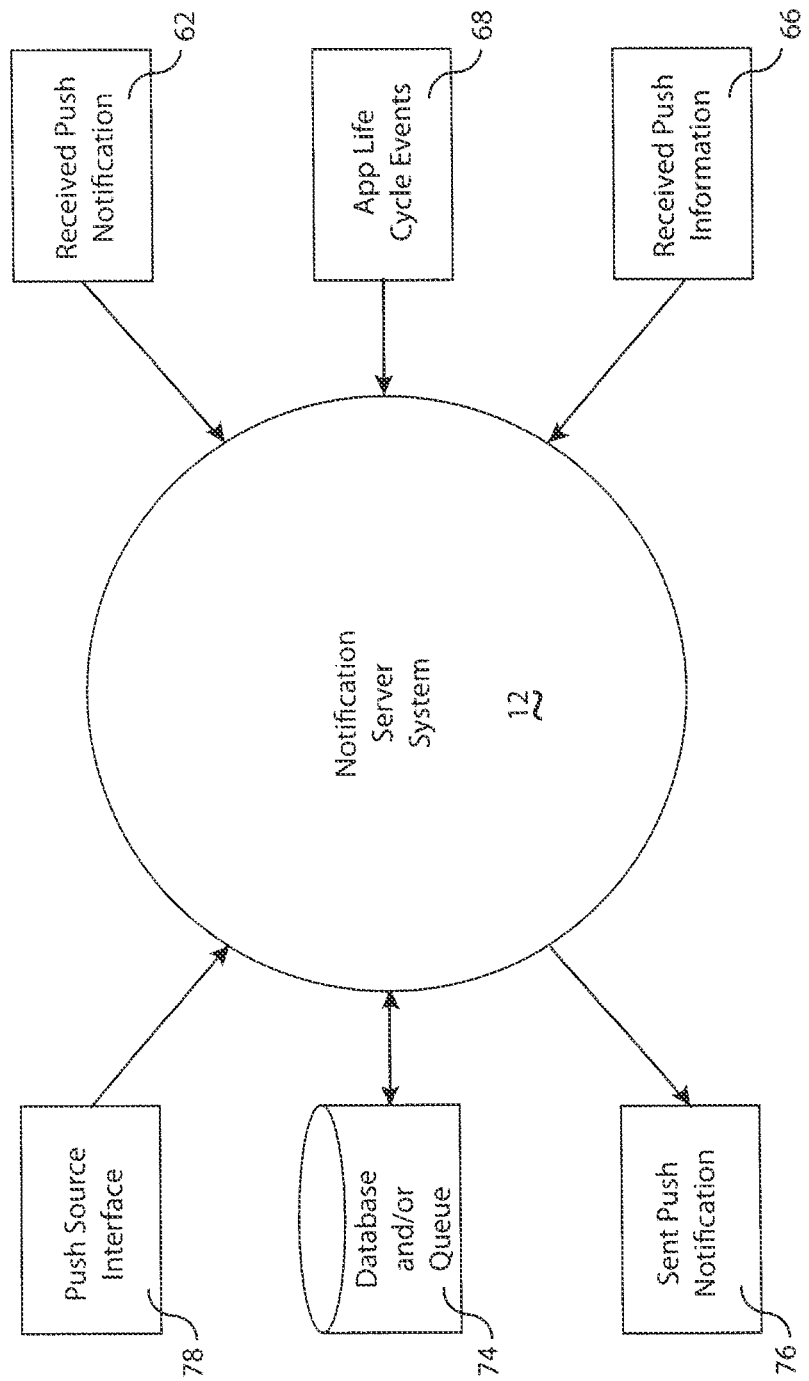
FIG. 4 is an illustration of example processes and operations of the notification server system 12 of FIG. 1.

FIG. 4 is an illustration of certain computer implemented processes performed by the example notification server system 12. The processes of notification server system 12 are responsive to: received push notification 62 from a push source such as, for example, push originator system 16 of FIG. 1; a received push information 66 from, for example, a client 20, 26 or 28; optional application ("app") life cycle events 68 from a client; and push source interface events 78 from a push source, such as push originator system 16. The processes of notification server system 12 are also illustrated to communicate with a database and/or queue 74, which may also form a part of the notification server 12. The notification server system 12 also provides a sent push notification 76, as will be explained in more detail subsequently.

By way of non-limiting example, the received push notification can be received by an API call from push originator server system 16 of FIG. 1. These API calls can be made, by way of a non-limiting example, using a REST based APL As well known to those of skill in the art, "REST" is an acronym for Representational State Transfers and is a way of organizing state transitions of and communications between computers (clients and servers) communicating in a network environment, typically using HTTP or HTTPS protocol. REST based operations often include the ability to create, read, update and delete resources specified by a hierarchical specifier in a URL. For example, an API call comprising a received push notification can be as follows:
push <message> <application> <recipient> <options>
  recipient can be a device GUID or a tag which refers to a stored list of device GUIDs
  <push token> is added as a named field for tracking After processing a received push notification 62, the notification server system 12 sends a sent push notification 76 to, for example, the push gateway server system 18 of FIG. 1. For example, a push notification can implement the following format:

push <message> <send token>

Notification server system 12 can also, for example, be responsive to a push source interface 78 which comprises, for example, a REST based API to be used to query statistical information concerning the use of a certain application which may be stored in database and queue subsystem 74, as well as many other kinds of queries, information upload operations, information update operations, and information deletion operations. By way of further example, notification server system 12 is also responsive to received push information 66 and/or app life cycle events 68, typically from clients.

Notification server system 12 can, for example, also include other processes such as processes to develop statistics from data stored in database and/or queue 74 such as received push information 66 and app life cycle events 68. For example, statistics can be developed such as the number of times a certain application program is opened, initialized, closed, foregrounded, backgrounded, etc. on one or more clients. An example of received push information 66 takes the following format:

push receive event <token> <payload>

An example of an app life cycle event 68 takes the following format:
life cycle event <payload>
the payload may contain information specifying what happened on the device like "started this application", etc.

A still further example process that can be performed by notification server system 12 is to periodically scan database and/or queue 74 for data that requires processing. After identifying such data, processes can be initiated to, for example, enqueue a job to process the database and/or queue, typically to create derived data products.

Figure 5:
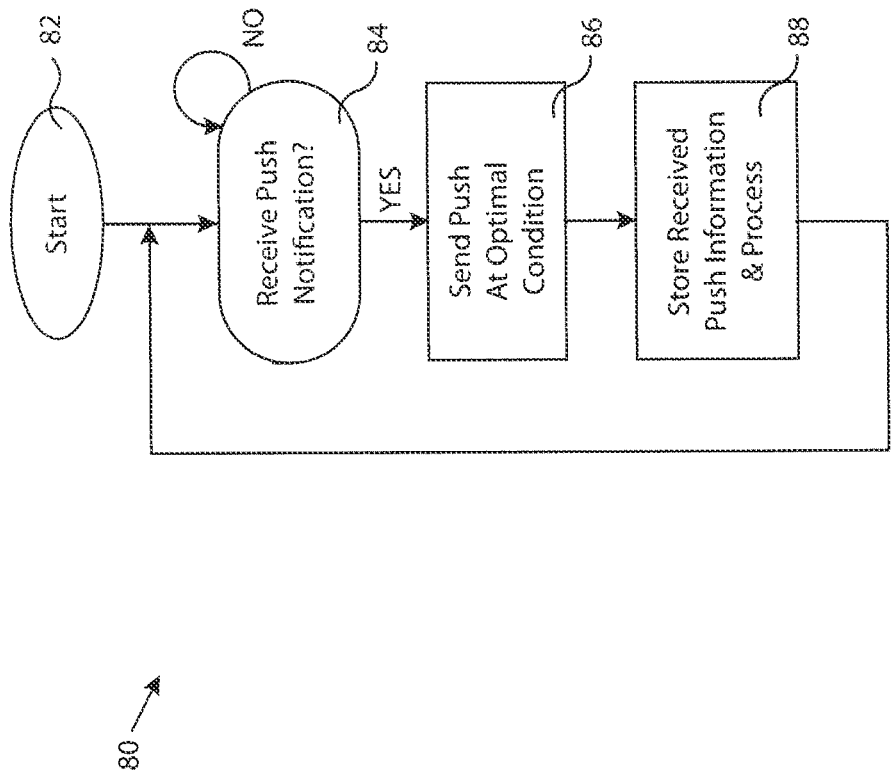
FIG. 5 is a flow diagram of an example process of the notification server system 12 of FIG. 1.

FIG. 5 is a flow diagram depicting a method 80 for delivering push notifications. The process begins with an operation 82 and continues in an operation 84 wherein a determination is made as to whether a received push notification has been received. Such received push notifications are typically the result of an API call from a push source that is using a web based API to make calls to a REST based web interface. The received push notification contains, for example, a message, a destination, and associated metadata. If in operation 84 a received push notification has not been received, then the process continues with a re-invocation of operation 84.

If it is determined in operation 84 that a received push notification has been received the process continues with an operation 86 in which a sent push notification is sent at an optimal condition. As used herein "optimal" may be used synonymously with "favorable", "improved" or the like to mean a condition which is meant to improve the result of a push. By way of non-limiting example, an "optimal condition" can be a favorable push notification time and/or a favorable push notification format. For example, a favorable push notification time could be just before a mealtime for a push notification having to do with a restaurant. As another example, a favorable push format may be to change the color, font size and/or font of the display of a push.

After the push notification has been sent by operation 86 an operation 88 stores and processes received push information. This occurs, for example, as a result of received push information being received from a device such as a phone or other device to which the push notification was sent. Such received push information may be the result of a user opening an application in response to a push notification that has resulted in passive indicia associated with an application of the device or an active notification such as modal dialog on the device in association with the application. The received push information. in this non-limiting example, can be stored and processed so that subsequent sent push notifications can be improved. Upon completion of operation 88, the process continues with operation 84 to await a new push notification.

Figure 6:
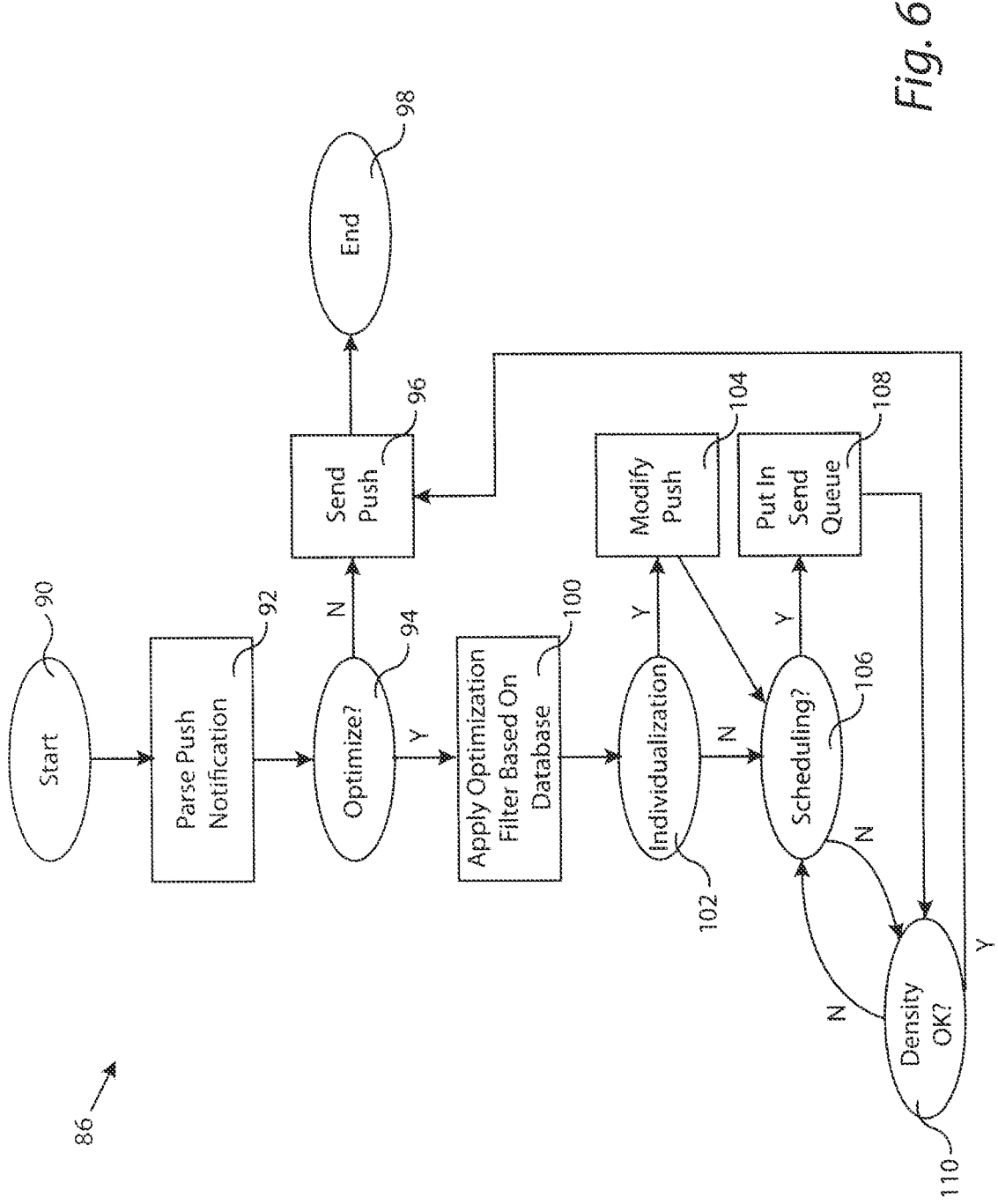
FIG. 6 is a flow diagram of an example SEND PUSH AT OPTIMAL CONDITION process of FIG. 5.

FIG. 6 is a flow diagram depicting operation 86 of FIG. 5 in greater detail. The process begins at 90 and continues in an operation 92 wherein a received push notification is parsed to develop a parsed received push notification. Then, in an operation 94, a determination is made as to whether or not to optimize a sent push notification. This determination may be made, for example, based on information in the push notification in conjunction with information in a database. For example, a certain application or "app" may be associated with information that is needed immediately. The database may contain information that says that received push notifications associated with this app must be delivered immediately. In other examples, a device, associated user, message type, message content etc. may all be used to determine whether or not one or more of the sent push notification(s) associated with a given received push notification may be optimized.

Since a given received push notification may result in multiple sent push notifications, operation 92 may be invoked multiple times for a single invocation of operation 86. If it is determined in operation 94 that a sent push notification should not be optimized, then that sent push notification is processed in operation 96. Operation 96 sends the sent push notification. Once the sent push notification is sent, the process with respect to that sent push notification ends at 98. Other sent push notifications associated with the parsed received push notification may still be in various stages of processing in the process of FIG. 6.

If it is determined in operation 94 that a sent push notification should be optimized, then the process continues in an operation 100 which applies a filter based upon the received push information in the database of received push information developed from a plurality of prior sent push notifications in order to provide, for example, a favorable push time, a favorable push format, or both, for the sent push notification. One or more parameters derived from the received push notification associated with the sent push notification may be used in the determination of a favorable push time, a favorable push format, or both. Then, in an operation 102, a determination is made as to whether the sent push notification should be personalized.

If it is determined in operation 102 that the sent push notification should be personalized, then the process continues in an operation 104 which modifies the sent push notification. Such modification alters the presentation of the push notification in some way, resulting in a favorable push format. By way of non-limiting example, such alteration may include altered or additional visual display, altered or additional message content, altered or additional sound or vibration or a combination of alterations. The process then continues with operation 106 which determines whether or not the sent push notification can be scheduled.

If, in operation 106, it is determined that the sent push notification can be scheduled, then the process continues in an operation 108 which places the sent push notification in a send queue. The process then continues in an operation 110 which determines whether the message density is acceptable. That is, if at the current time (e.g. as provided by a real-time clock) the destination of the sent push notification has been saturated with sent push notifications to such a degree that further sent push notifications could annoy the user (and possibly cause him to turn off push notifications) then the density would be deemed unacceptable. Thus, if it is determined in operation 110 that the density is acceptable, then the process continues in operation 96 described earlier and the process is complete at 98.

Figure 7:
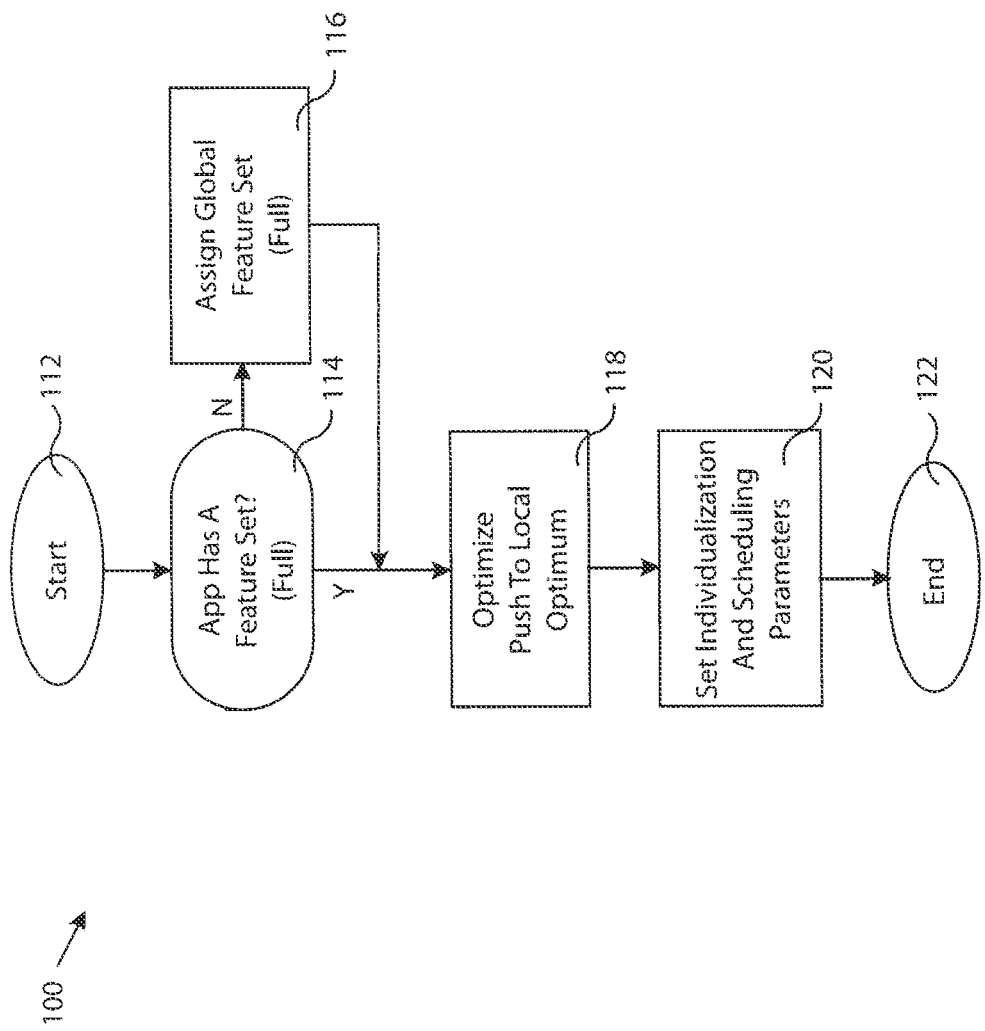
FIG. 7 is a flow diagram of an example APPLY OPTIMIZATION FILTER BASED ON DATABASE process of FIG. 6.

FIG. 7 is a flow diagram depicting a process of operation 100 of FIG. 6 in greater detail. The process 100 of FIG. 7 may operate on more than one received push notification. Thus, multiple invocations of the process 100 of FIG. 7 may occur as a result of multiple received push information being available to be processed at the time of invocation of the process 100. If these operations are performed concurrently, care is preferably taken to ensure that the database of received push information developed from a plurality of prior sent push notifications is consistent with respect to the information being processed. Thus various data locking mechanisms may be employed to ensure the integrity of the database of received push information developed from a plurality of prior sent push notifications.

The process 100 begins at 112 and continues with an operation 114 which determines if a full feature set for an app associated with a given received push notification is available in the database of received push information. If it is determined in operation 114 that a full feature set is not available, then the process continues with operation 116 which uses a general purpose "global" feature set as a starting point for features that are missing but for which some initial value is needed. This addresses the "cold start" condition present in systems that perform iterative refinement of a database, and which use the database during the process. Once initialized, the app feature set will gradually adapt based on received push information and additional device information observed over time. Upon completion of operation 116 assigning the global feature set to be used initially for features that are missing for this app/user combination, the process continues with operation 118.

Operation 118 causes the sent push notification to conform to a local favorable condition reflected in the database of received push information for this app/user combination. The process then continues with an operation 120 which sets individualization and scheduling parameters for this sent push notification. The process is then completed at 122. If it was determined in operation 114 that the app has a full feature set. then the process 100 skips operation 116 and continues directly with operation 118.

Figure 8:
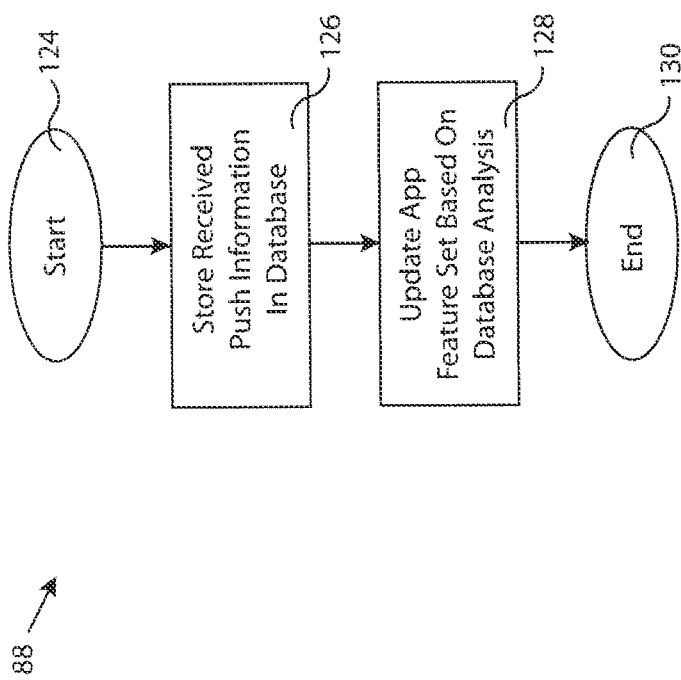
FIG. 8 is a flow diagram of an example STORE RECEIVED PUSH INFORMATION process of FIG. 5.

FIG. 8 illustrates, by way of non-limiting example, operation 88 of FIG. 5 in greater detail. Process 88, in this example, begins at 124 and, in an operation 126, received push information is stored in a database. By way of non-limiting example, the received push information can be stored in a database 74 of FIG. 4. Next, in an operation 128, an app feature set can be updated based upon database analysis. The process 88 is completed at 130.

It will be appreciated that the database analysis of operation 128 can be performed using a variety of data analysis techniques. By way of non-limiting example, set of data analysis techniques grouped under the umbrella term "data mining" are useful in that data mining techniques focus on modeling and knowledge discovery for predictive rather than purely descriptive purposes.

Data mining is an interdisciplinary field of computer science wherein patterns are extracted from large data sets by combining methods from statistics, artificial intelligence and database management. Data mining also encompasses data dredging, data fishing and data snooping wherein data mining techniques are used to sample parts of a larger population data set that are (or may be) too small for reliable statistical inference to be made about the validity of any patterns discovered. Data dredging, data fishing and data snooping techniques can, however, be used in creating new hypotheses to test against larger data populations or to be tested for validity in a more empirical fashion.

As will be appreciated by those of skill in the art, data mining can include one or more methods and algorithms. By way of non-limiting examples, these methods and algorithms may include association rule learning, cluster analysis, constructive induction, data analysis. decision trees, factor analysis, knowledge discovery, neural nets, predictive analytics, reactive business intelligence, regression, structured data analysis (statistics), and text mining.

By way of non-limiting example, a useful data mining technique is "cluster analysis" or "'clustering." With cluster analysis, a set of observations (including, for example. received push information from the database) are assigned into subsets known as "'clusters" so that observations in the same cluster are similar in some sense. An important step in most clustering techniques is to select a distance measure which will determine the similarity of two observations or "elements" is calculated.

Decision tree techniques encompass decision support tools which use a tree-like graph or model of decisions and their possible consequences, including chance event outcomes. resource costs and utility. Decision trees can be used in decision analysis to help identify a strategy most likely to reach a goal, e.g. the optimization of a push notification.

Factor analysis is a statistical method used to describe variability among observed variables in terms of a potentially lower number of unobserved variables called factors. For example, variations in three or four observed variables may reflect the variations in a single unobserved variable, or in a reduced number of unobserved variables. Factor analysis searches for such joint variations in response to unobserved latent variables.

Knowledge discovery is a concept in the field of computer science that describes the process of automatically searching large volumes of data for patterns that can be considered knowledge about the data. It is categorized according to what kind of data is searched and in what form the result of the search is represented.

An artificial neural network (ANN), often simply called a neural network (NN), is a computational model that is inspired by the structure and/or functional aspects of biological neural networks. A neural network includes an interconnected group of artificial neurons (e.g. programmed constructs that mimic properties of biological neurons) and it processes information using a connectionist approach to computation. In most cases, an ANN is an adaptive system that changes its structure based on external or internal information that flows through the ANN during a learning phase. Modem ANN can typically be considered to be non-linear, statistical data modeling tools and are often used to model complex relationships between inputs and output to find patterns in the data.

Predictive analytics encompass a variety of statistical techniques from modeling, data mining and game theory that analyze current and historical facts to make predication about future events. Models formed from predictive analytic techniques can capture relationships among many factors to allow an assessment of risk and reward associated with a particular set of conditions to guide in a decision making process.

Regression analysis encompasses statistical techniques which can estimate relationships among variables. Types of regression analysis include linear regression models, simple linear regression, logistic regression, nonlinear regression, nonparametric regression, robust regression and stepwise regression.

Text mining, sometimes referred to as "text data mining", refers to the process of deriving high-quality information from text (e.g. in a push message). High-quality information may be derived through the identification of patterns and trends by, for example, a statistical pattern learning process. Text mining usually involves the process of structuring the input text (usually parsing, along with the addition of some derived linguistic features and the removal of others, with the subsequent insertion into a database), deriving patterns within the structured data and evaluating and interpreting the output.

Figure 9:
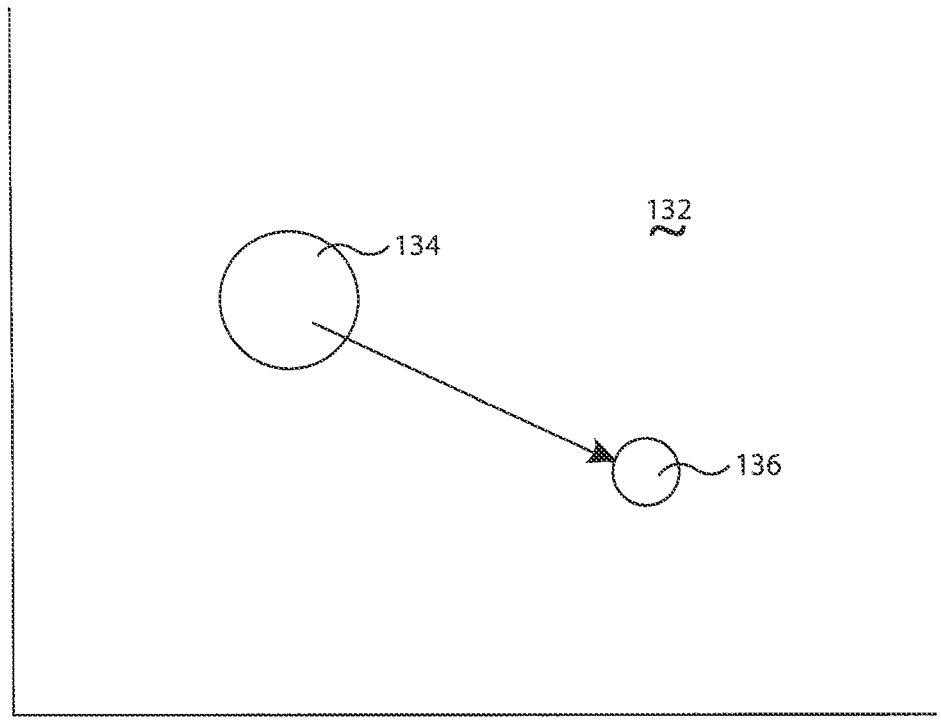
FIG. 9 is graph illustrating an optimization process, set forth by way of example and not limitation.

FIG. 9 is a graph depicting a data multi-dimensional feature space 132 depicted in simplified form as a two dimensional space by way of non-limiting example.

Received push information regarding previous sent push notifications may be collected and stored. Some sent push notifications may be "converted" through user interaction in response to the sent push notification. When a sent push notification is converted, received push information may be received from the device and stored in the database.

Many parameters may be collected which can become feature vectors in the multi-dimensional space. Various derivative representations of the data may be developed by processes which use the received push information in the database as input, and produce derivative data structures which can map the feature vectors into a form that can be used to determine a favorable time or favorable format for subsequent sent push notifications, by way of non-limiting examples.

Initially, in this example, the multi-dimensional space 132 may be populated by features that are obtained from an aggregate of demographically or otherwise similar users. The points in this initial set of feature vectors may form "clusters" of points which represent sent push notifications that have been successfully "converted" through user interaction as a result of a push. In some instances, an inference may be made that a user interaction with a given app is the result of a push notification when the interaction is shortly after a push notification.

Favorable clusters of aggregate feature vectors 134 are depicted in FIG. 9, by way of non-limiting example. Thus, sent push notifications that are within this cluster in multi-dimensional space will be sent, in this example. Push notifications that are outside of this cluster may, in some cases, be adjusted so that they are within the cluster and the altered sent push notification may then be sent. The feature set of a new device application combination, in this example, is measured against known clusters of device and application features. At any given time in the system, there will be a number of clusters that represent similar device and application combinations. When a new device is observed. its multi-dimensional feature set is compared using one or more distance metrics including, but not limited to, Euclidean distance, Levenshtein distance, or Mahalanobis distance. Using multiple distance calculations, a composite distance for a new device from one of the existing clusters and associate that device with the nearest cluster can be derived, in this example. Based on the example association, optimized pushes to the new application device combination can be delivered as would deliveries to the rest of the cluster in the near term.

Figure 10:
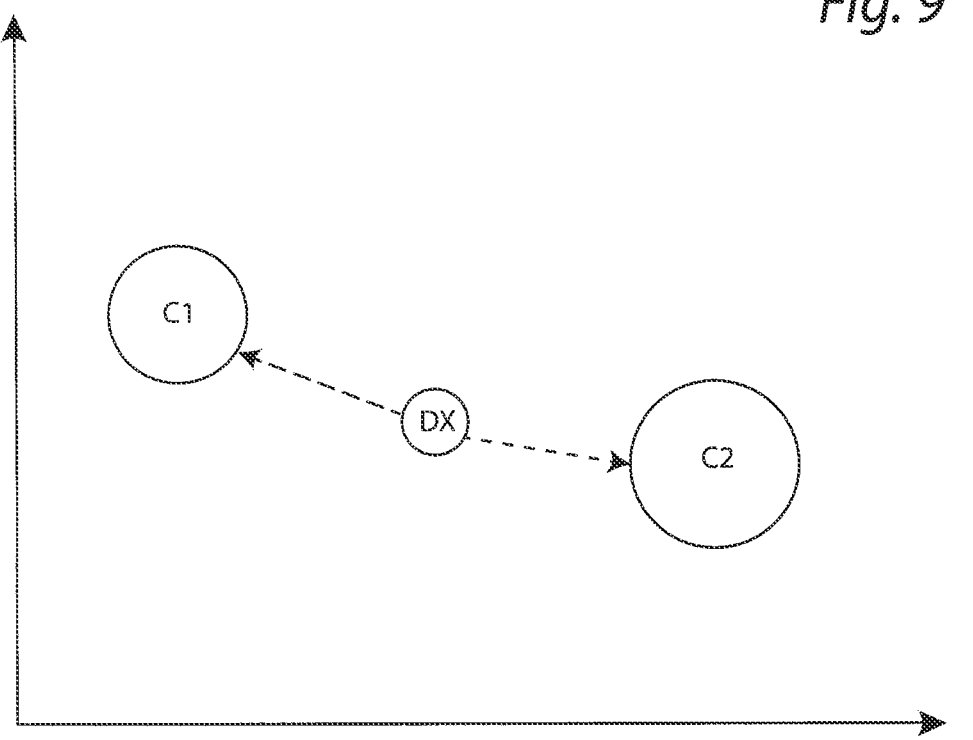
FIG. 10 is a graph further illustrating an optimization process, set forth by way of example and not limitation.

In FIG. 10, a new device DX may be measured for affinity to two different clusters C 1 and C2, by way of non-limiting example. Each cluster will have an attraction based on the composite distance measurement. This initial association is only for new device and application combinations. Over time the weights and ranks of features in an application device combination will be personalized based on user response to pushes.

Over time, with the addition of more feature vectors that are particular to the specific user and application associated with a push notification will populate the space, and, in certain embodiments, they will displace feature vectors associated with the aggregate. In other examples, feature vectors weight of importance will fade over time. Newer feature vectors may cause a highly favorable region to drift over time to an area of multi-dimensional space that is more personalized to the specific application and user.

The new personalized favorable area 136 is shown in FIG. 9 by way of non-limiting example. Sent push notifications that are within this cluster in multi-dimensional space can, for example, be sent. Push notifications that are outside of this cluster may in some cases be adjusted so that they are within the cluster and the altered sent push notification can then be sent.

A further example process for optimizing a push notification delivery system with feedback analysis follows. In this non-limiting example, received push information regarding previous sent push notifications is collected and stored in a database. Some sent push notifications are "converted" through user interaction in response to the sent push notification, and others are not. When a sent push notification is converted, received push information can be received from the device and stored in the database. Many parameters can be collected which may be represented as feature vectors in a multi-dimensional space. Various derivative representations of the data may developed by processes which use the received push information in the database as input and can produce derivative data structures which map the feature vectors into a form that can be used to determine a favorable time or favorable format for subsequent sent push notifications.

One such structure is a "K-D tree" which can organize vast amounts of information into a multi-dimensional data structure that can be rapidly queried, by way of non-limiting example. The K-D tree is so named because it supports an arbitrarily high number (K) of dimensions. One example K-D tree would store feature vectors for each sent push notification, whether or not the sent push notification was successfully converted. Those vectors that represent a successfully converted sent push notification will represent a location in the multi-dimensional space where it is was successful to send a sent push notification, and will have a re-enforcing effect for future sent push notifications. Those feature vectors that represent a sent push notification that was not successfully converted represent a location in multidimensional space where it was not successful to send a sent push notification, in this non-limiting example. These locations will have a negative-reinforcing effect for future sent push notifications.

Over time "hot" and "cold" areas are developed in the multi-dimensional space, in this example. Hot areas represent portions of the multi-dimensional space where it is favorable to send a push notification, while cold areas represent portions of the multi-dimensional space where it is undesirable to send a push notification.

As new data is collected for a given region of the multi-dimensional space, old data is associated with a lower "weight" relative to that of the new data. In certain embodiments, the relevance of data is tapered off on a logarithmic scale. This is considered advantageous, in this example, because the initial set of feature vectors for the multi-dimensional space are derived not from personal information, since none are available at the outset, but from general information about an aggregate of users that are demographically or otherwise similar to this user.

In this example, the K-D tree is queried for data surrounding a point for which the system proposes to send a push notification. The query space can be, for example, a hypersphere surrounding the point. All feature vectors within that hypersphere are returned as the query result. These feature vectors each have either a positive or negative effect on the favorability of sending a push notification corresponding to the given point in multidimensional space. An overall metric of favorability is developed for this point in multi-dimensional space based upon the feature vectors that are returned.

Each feature is associated with a "weight" that can be developed using, for example, a Pearson correlation relating the feature to successful conversion, by way of non-limiting example. Such weights can be used in a number of ways to adjust their respective features' importance in the metric of favorability. For example, the scale of the corresponding dimensions can be adjusted so that less important data is spread over a greater area in the multi-dimensional space. Alternatively, the weight can be used to affect the impact of the associated feature vector on the overall favorability metric of a given point.

Since a richer set of information is available for successful conversions than for unsuccessful, there exists an imbalance in terms of the number of dimensions in which the two kinds of information can exist in the multi-dimensional space. It may therefore be desirable, in this example, to replicate the unsuccessful feature vectors so that they occupy multiple locations along the axes for which no data is available or applicable.

Engagement with an application at various times of day independently of a sent push notification can have a reinforcing effect in the portions of multi-dimensional space that represent that interaction. This kind of interaction can therefore make previously "cold" areas of the multi-dimensional space turn "hot." This can be advantageous in that the presence of cold areas in the multi-dimensional space may have a self-reinforcing effect. e.g. since an area is so cold that no sent push notifications are ever sent, dynamic change in that area requires some outside event such as independent engagement with the application.

The aforementioned overall favorability metric associated with a given point in K-D space, in this example, may be deemed to warrant sending a sent push notification at the time and or manner associated with that point in multi-dimensional space. When this occurs, a search for a more acceptable point may be conducted. Various other locations in the space can be queried, and associated favorability metrics can be obtained. Such points may represent future times or alternative means of presentation or both. When one or more acceptable point is found, a "best" one (e.g. the one considered to be the most favored) can be selected, and the sent push notification can be scheduled for delivery. It is often desirable to favor an acceptable point that is associated with a relatively nearby time over points that are far in the future.

In this example, maintenance of the K-D tree can include the removal of old data or the rescaling of a dimension. It may therefore be desirable to rebuild the tree periodically. Alternatively, the tree may be edited to reflect new data or new weights. Other processes may also or alternatively be performed, as will be appreciated by those of skill in the art.

It will be appreciated that the forgoing systems and processes include computer implemented processes. As such, a number of different hardware and software platforms may be used to implement the systems and processes described herein. The processes are generally stored as program instructions including code segments in non-transitory computer readable media that can be accessed, directly or indirectly, by systems and/or devices as disclosed herein or otherwise. Furthermore, although various embodiments have been described using specific terms, words and/or phrases, such description is for illustrative purposes only. The terms, words and/or phrases used are for the purpose of description rather than of limitation.

It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A computer-implemented method comprising:
receiving, via a web interface, information related to one or more messages, wherein a particular one of the messages is to be delivered via a push notification associated with a mobile application;
receiving, via the web interface, destination information of the one or more messages, wherein the destination information includes information to identify one or more target devices on which the messages are intended to be delivered;
receiving a set of push information associated with the one or more target devices, the push information comprising information related to application life cycle events of the mobile application of the one or more target devices;
determining a push time for the particular one of the messages to be transmitted; and
transmitting the particular one of the messages to at least one of the target devices as a push notification in accordance with the push time and responsive to an occurrence of a target life cycle event at the at least one of the target devices.

2. The computer-implemented method of claim 1, wherein the web interface includes an application programming interface (API).

3. The computer-implemented method of claim 1, wherein the web interface includes a software platform.

4. The computer-implemented method of claim 1, wherein the push information comprises information developed from a plurality of prior sent push notifications.

5. The computer-implemented method of claim 1, wherein the push time is determined based on the push information.

6. The computer-implemented method of claim 1, wherein the push time is relative to the occurrence of the target life cycle event.

7. The computer-implemented method of claim 6, wherein the target life cycle event is specified by a push originator via the web interface.

8. The computer-implemented method of claim 1, wherein the target life cycle event is one of the following: the mobile application is opened, initialized, closed, foregrounded, or backgrounded.

9. The computer-implemented method of claim 1, wherein the push time is determined from the push information by one or more data mining techniques including one or more of the following: cluster analysis, decision trees, factor analysis, knowledge discovery, neural nets, predictive analytics, regression, or text mining.

10. A system comprising:
a web interface configured to:
receive information related to one or more messages, wherein a particular one of the messages is to be delivered via a push notification associated with a mobile application;
receive destination information of the one or more messages, wherein the destination information includes information to identify one or more target devices on which the messages are intended to be delivered;
a computing server comprising memory and one or more processors, the memory storing executable instructions, wherein the instructions, when executed by the one or more processors, cause the one or more processors to:
receive a set of push information associated with the one or more target devices, the push information comprising information related to application life cycle events of the mobile application of the one or more target devices;
determine a push time for the particular one of the messages to be transmitted; and
transmit the particular one of the messages to at least one of the target devices as a push notification in accordance with the push time and responsive to an occurrence of a target life cycle event at the at least one of the target devices.

11. The system of claim 10, wherein the web interface includes an application programming interface (API).

12. The system of claim 10, wherein the web interface includes a software platform.

13. The system of claim 10, wherein the push information comprises information developed from a plurality of prior sent push notifications.

14. The system of claim 10, wherein the push time is determined based on the push information.

15. The system of claim 10, wherein the push time is relative to the occurrence of the target life cycle event.

16. The system of claim 15, wherein the target life cycle event is specified by a push originator via the web interface.

17. The system of claim 10, wherein the target life cycle event is one of the following: the mobile application is opened, initialized, closed, foregrounded, or backgrounded.

18. The system of claim 10, wherein the push time is determined from the push information by one or more data mining techniques including one or more of the following: cluster analysis, decision trees, factor analysis, knowledge discovery, neural nets, predictive analytics, regression, or text mining.

19. A system comprising:
one or more processors; and
memory storing executable instructions, wherein the instructions, when executed by the one or more processors, cause the one or more processors to:
receive, via a web interface, information related to one or more messages, wherein a particular one of the messages is to be delivered via a push notification associated with a mobile application;
receive, via the web interface, destination information of the one or more messages, wherein the destination information includes information to identify one or more target devices on which the messages are intended to be delivered;
receive a set of push information associated with the one or more target devices, the push information comprising information related to application life cycle events of the mobile application of the one or more target devices;
determine a push time for the particular one of the messages to be transmitted; and
transmit the particular one of the messages to at least one of the target devices as a push notification in accordance with the push time and responsive to an occurrence of a target life cycle event at the at least one of the target devices.

20. The system of claim 19, wherein the target life cycle event is one of the following: the mobile application is opened, initialized, closed, foregrounded, or backgrounded.

* * * * *